United States Patent
Kannan (10) Patent No.: US 8,914,815 B2
(45) Date of Patent: Dec. 16, 2014

(54) AUTOMATED FRAMEWORK FOR TRACKING AND MAINTAINING KERNEL SYMBOL LIST TYPES

(71) Applicant: Red Hat, Inc., Raleigh, NC (US)

(72) Inventor: Shakthi Kannan, Pune (IN)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 13/931,446

(22) Filed: Jun. 28, 2013

(65) Prior Publication Data

US 2014/0344832 A1    Nov. 20, 2014

(30) Foreign Application Priority Data

May 18, 2013   (IN) ............................. 1488/DEL/2013

(51) Int. Cl.
  *G06F 13/00*    (2006.01)
  *G06F 9/54*     (2006.01)
(52) U.S. Cl.
  CPC ........................................ *G06F 9/54* (2013.01)
  USPC ........................................................... 719/328
(58) Field of Classification Search
  CPC ........................................................ G06F 9/541
  USPC .............................................................. 719/328
  See application file for complete search history.

(56) References Cited

U.S. PATENT DOCUMENTS

| | | | |
|---|---|---|---|
| 6,694,510 B1 * | 2/2004 | Willems ........................ | 717/124 |
| 6,804,813 B1 | 10/2004 | Willems et al. | |
| 7,076,770 B2 * | 7/2006 | Handal ......................... | 717/136 |
| 8,335,935 B2 | 12/2012 | Thomas et al. | |
| 8,473,565 B2 * | 6/2013 | Browning et al. ............ | 709/212 |
| 8,527,989 B2 * | 9/2013 | Filali-Adib et al. ............. | 718/1 |
| 2003/0145127 A1 * | 7/2003 | Unice ........................... | 709/321 |
| 2007/0250927 A1 | 10/2007 | Naik et al. | |
| 2010/0115273 A1 * | 5/2010 | Chittigala ..................... | 713/164 |
| 2012/0011503 A1 * | 1/2012 | Filali-Adib et al. ............. | 718/1 |
| 2012/0054868 A1 | 3/2012 | Ramalingam | |
| 2012/0197918 A1 * | 8/2012 | Browning et al. ............ | 707/756 |

FOREIGN PATENT DOCUMENTS

KR          20010038541 A          5/2001

OTHER PUBLICATIONS

Jon Masters. "RHEL5 Driver Update Program Technical Whitepaper." Oct. 9, 2007. Print. 24 Pages.

Jon Masters. "Red Hat Driver Update Packages: Official Reference Guide." Version 0.99. Jan. 6, 2011. Print. 58 Pages.

Bob Mader. "Dealing with 3rd-party Kernel Module Headaches." Summit JBoss World. Web. <www.theredhatsummit.com>. Last accessed Jun. 27, 2013.

* cited by examiner

*Primary Examiner* — Andy Ho
(74) *Attorney, Agent, or Firm* — Haynes and Boone, LLP (57) ABSTRACT

Systems and methods are provided for tracking and maintaining kernel symbol list types. An example system includes a request tracker that receives from a consumer an identifier of a first kernel and at least one of a first set of kernel symbols of a first list type and a second set of kernel symbols of a second list type, where each kernel symbol of the first list type is included in a kernel application binary interface of the associated kernels. The system further includes a comparison module that compares kernel symbols included in the first kernel to kernel symbols included in the second kernel. The system also includes a notification module that sends, based on the comparison, a notification to the consumer, where the notification indicates a change in a kernel symbol included in the first kernel or second kernel.

20 Claims, 6 Drawing Sheets

AUTOMATED FRAMEWORK FOR TRACKING AND MAINTAINING KERNEL SYMBOL LIST TYPES

FIELD OF DISCLOSURE

The present disclosure generally relates to a computing system, and more particularly to kernels.

BACKGROUND

In computing, an operating system may provide an environment in which the user is able to run application software. The applications that users run rely on services provided by the operating system to perform tasks while they execute, in many cases without the user—or even the programmer—giving much thought to them. For example, for an application to read a file from disk, the programmer may simply call a function that the operating system provides, and the operating system may handle the specific steps required to perform that read accordingly. As such, the application programmer is freed from having to worry about the differences between reading a file that resides on the computer's internal hard disk or a file on an external USB flash drive; the operating system takes care of such matters.

An operating system may include a kernel that serves as a central component for facilitating communication between software applications and hardware devices (e.g., central processing unit (CPU), memory, and input/output (I/O) devices) of a machine. For example, a kernel may be responsible for facilitating operating system functions and various management tasks (e.g., process management, disk management, and memory management).

BRIEF SUMMARY

This disclosure relates to kernels and kernel symbols. Methods, systems, and techniques for tracking and maintaining kernel symbol list types are provided.

According to an embodiment, a system for tracking and maintaining kernel symbol list types includes a request tracker that receives from a consumer an identifier of a first kernel and at least one of a first set of kernel symbols of a first list type and a second set of kernel symbols of a second list type. The system also includes a database that stores one or more kernel symbols of the first list type and one or more kernel symbols of the second list type. Each kernel symbol of the first list type and of the second list type in the database are included in one or more kernels. Each kernel symbol of the first list type is included in a kernel ABI (application binary interface) of one or more of the associated kernels. The request tracker stores in the database at least one of the first set of kernel symbols of the first list type and the second set of kernel symbols of the second list type. The system further includes a comparison module that identifies a second kernel associated with a third set of kernel symbols of the first list type and a fourth set of kernel symbols of the second list type and compares one or more kernel symbols included in the first kernel to one or more kernel symbols included in the second kernel. The system also includes a notification module that sends, based on the comparison, a notification to the consumer. The notification indicates a change in one or more kernel symbols included in the first kernel or second kernel.

According to another embodiment, a method of tracking and maintaining kernel symbol list types includes receiving, by one or more processors, from a consumer an identifier of a first kernel and at least one of a first set of kernel symbols of a first list type and a second set of kernel symbols of a second list type. The method also includes storing in a database the kernel identifier and at least one of the first set of kernel symbols of the first list type and the second set of kernel symbols of the second list type. Each kernel symbol of the first list type and of the second list type in the database are included in one or more kernels. Each kernel symbol of the first list type is included in a kernel ABI (application binary interface) of one or more of the associated kernels. The method further includes identifying a second kernel associated with a third set of kernel symbols of the first list type and a fourth set of kernel symbols of the second list type. The method also includes comparing one or more kernel symbols included in the first kernel to one or more kernel symbols included in the second kernel. The method further includes sending, based on the comparison, a notification to the consumer. The notification indicates a change in one or more kernel symbols included in the first kernel or second kernel.

According to another embodiment, a non-transitory machine-readable medium includes a plurality of machine-readable instructions that when executed by one or more processors are adapted to cause the one or more processors to perform a method including: receiving, by one or more processors, from a consumer an identifier of a first kernel and at least one of a first set of kernel symbols of a first list type and a second set of kernel symbols of a second list type; storing in a database the kernel identifier and at least one of the first set of kernel symbols of the first list type and the second set of kernel symbols of the second list type, where each kernel symbol of the first list type and of the second list type in the database are included in one or more kernels, and each kernel symbol of the first list type is included in a kernel ABI (application binary interface) of the one or more associated kernels; identifying a second kernel associated with a third set of kernel symbols of the first list type and a fourth set of kernel symbols of the second list type; comparing one or more kernel symbols included in the first kernel to one or more kernel symbols included in the second kernel; and sending, based on the comparison, a notification to the consumer, the notification indicating a change in one or more kernel symbols included in the first kernel or second kernel.

BRIEF DESCRIPTION OF THE DRAWINGS

The accompanying drawings, which form a part of the specification, illustrate embodiments of the invention and together with the description, further serve to explain the principles of the embodiments. It should be appreciated that like reference numerals may be used to identify like elements or similarly functioning elements illustrated in one or more of the figures. The drawing in which an element first appears is generally indicated by the left-most digit in the corresponding reference number.

DETAILED DESCRIPTION

I. Overview
A. Example Host Machine Executing a Kernel
B. Categories of Kernel Symbols
II. Example System Architecture
A. Store the Kernel Symbol Data
　　1. Third-Party Vendor Kernel Consumer
　　2. Internal Kernel Consumer
B. Compare Kernel Symbols and Notifications
　　1. Non-white List Kernel Symbol of a First Kernel May be Incorporated into the White List of a Second Kernel
　　2. Changes to a Non-white List Kernel Symbol
III. Scaling Out to the Cloud
IV. Example Methods
V. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A. Example Host Machine Executing a Kernel

Figure 1:
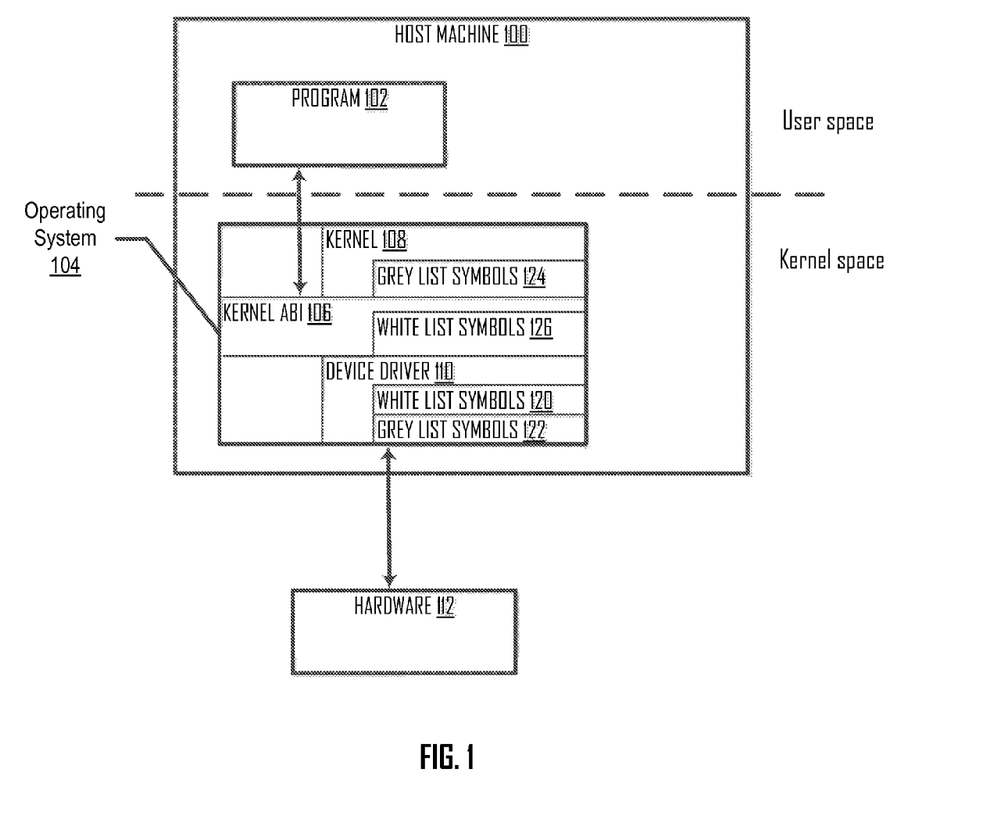
FIG. 1 illustrates a host machine including a kernel, according to an embodiment.

FIG. 1 illustrates a host machine 100 including a kernel, according to an embodiment. Terms like "machine," "device," "computer," and "computing system" are used interchangeably and synonymously throughout this document. Host machine 100 may include a server computing system or a client computing system.

In FIG. 1, host machine 100 may execute a program 102 in user space and is coupled to hardware 112. Program 102 may employ the services of an operating system 104. Operating system 104 serves as an interface between any hardware or physical resources of host machine 100 and a user (e.g., software developer, computer programmer, and system administrator). Operating system 104 includes a kernel ABI (application binary interface) 106, kernel 108, and device driver 110. Kernel ABI ("KABI") 106 is an interface between program 102 and operating system 104. KABI 106 also serves as an interface between kernel 108 and other parts of operating system 104, such as device driver 110.

Device driver 110 abstracts out the details of hardware 112 so that it is unnecessary for an application programmer to be concerned with the details of hardware 112. Device driver 110 and kernel 108 execute in kernel space. Device driver 110 may invoke kernel symbols included in kernel 108. A kernel symbol may refer to a function name and parameters included in the kernel. In an example, the kernel symbol may be a function name in the C programming language. Other programming languages may also be used.

An operating system provider or kernel provider may determine which kernel symbols to include in the kernel and the KABI. Stability of the KABI is a critical issue for many third-party kernel software vendors and third-party kernel hardware vendors that provide device drivers and peripheral devices. For example, a device driver may be designed to work with a particular version of a kernel and certain standard functions and data structures within the kernel may be relied upon by external parties.

A third-party vendor may refer to a device driver developer or anyone consuming kernel subsystem functions or subsystem APIs (application programming interfaces). For example, the third-party vendor may be a cloud provider that consumes a networking stack and the networking subsystem (e.g., Internet subsystem) has different functions consumed by the cloud provider. Some of the code of the networking subsystem may be included in the kernel. In another example, the device driver may invoke a kernel-provided print function (e.g., printk( )). If the kernel provider changes the interface between the device driver and the print function, the device driver may need to be recompiled; otherwise, if the device driver attempts to invoke the original print function using the updated interface, errors may result and host machine 100 may freeze or crash. Thus, it may be desirable to maintain and track changes to kernel symbols and provide the third-party vendor with this data.

It may also be desirable to provide internal kernel consumers with this kernel symbol data. An internal kernel consumer may refer to a team within the kernel providing company. The internal kernel consumer may be tasked with the responsibility of maintaining and updating the kernel. As such, the internal team may want a list of kernel symbols that the company has guaranteed will not change. This may help to ensure that these kernel symbols are included in the subsequent release of the kernel and do not change. Further, the internal team may also want to know which kernel symbols are being used in which kernel versions and the popularity of a kernel symbol. As such, the internal team may have an easier time with the kernel release process and maintaining the kernel. For example, if the internal team is aware that a particular kernel symbol is very popular in a non-white list, the internal team may decide to include the popular kernel symbol to the KABI white list.

B. Categories of Kernel Symbols

This disclosure provides categories of list types that add value to kernel symbols and also to internal and external kernel consumers. The categories may include, for example, white list kernel symbols and non-white list kernel symbols.

Device driver 110 includes white list kernel symbols 120 and non-white list kernel symbols 122. Kernel 108 includes white list kernel symbols 126 and non-white list kernel symbols 124 that may be invoked by, for example, device driver 110. Kernel symbols included in KABI 106 may refer to a list of kernel symbols that are part of the "white list" of kernel 108. White list kernel symbols 120 and 126 are defined as being part of KABI 106 and are guaranteed to not change in one or more subsequent release cycles or releases of the kernel to which they are associated. The kernel provider may determine which kernel symbols to include in the white list of the kernel.

Non-white list kernel symbols 122 and 124 are not part of KABI 106 and may change in one or more subsequent release cycles or releases of the kernel. The white list of kernel symbols may be mutually exclusive of the non-white list of kernel symbols. A non-white list kernel symbol may be, for example, a grey list kernel symbol or a black list kernel symbol. The grey list kernel symbol may refer to a kernel symbol that may be included in the kernel symbol white list in a subsequent release of the kernel. The black list kernel symbol may refer to a kernel symbol that the kernel provider will not support in the subsequent kernel release. Black list kernel symbols may include kernel symbols that are infrequently used or associated with a questionable source. The kernel provider determines which kernel symbols are included in the black list of the kernel. Although two kernel symbol categories are described, it should be understood that categories including more than two kernel symbols are within the scope of this disclosure. For example, the kernel symbol categories may include white list kernel symbols, non-white list kernel symbols, and black list kernel symbols.

Providing the white list and non-white list category may add value to kernel consumers because they may readily identify which kernel symbols (e.g., white list kernel symbols) are trustworthy symbols that may continue to be used in confidence. For example, the third-party vendor may develop a new version of its device driver and use the white list kernel symbols in the previous device driver version in the updated device driver with confidence. The third-party vendor may be weary regarding the non-white list kernel symbols and watch out for changes regarding these symbols because the kernel provider has not yet stated that these symbols will be supported in further releases of the kernel.

The kernel provider may also benefit from this kernel symbol categorization. For example, the kernel provider is aware of which kernel symbols should not be changed by identifying the kernel symbols in the white list. As such, the white list of kernel symbols may help in maintaining a stable kernel ABI across a particular kernel product release. Further, the subsequent version of a kernel is guaranteed to retain a level of compatibility with other previous versions of the kernel.

The kernel provider determines whether to incorporate a kernel symbol into the white list. It may be desirable to reduce the quantity of kernel symbols incorporated in the white list to reduce the size of the kernel. Thus, it may be advantageous to determine the popularity of kernel symbols amongst external consumers (e.g., third-party vendors) and the consumer's input on particular kernel symbols. The internal team may then consider the popularity of a non-white list kernel symbol associated with a kernel to determine whether to incorporate the kernel symbol in a next release of the kernel.

Accordingly, it may be desirable to provide a framework to track internal kernel symbols, consumer white list kernel symbols, and kernel symbols that consumers request for inclusion into the white list.

II. Example System Architecture

Figure 2:
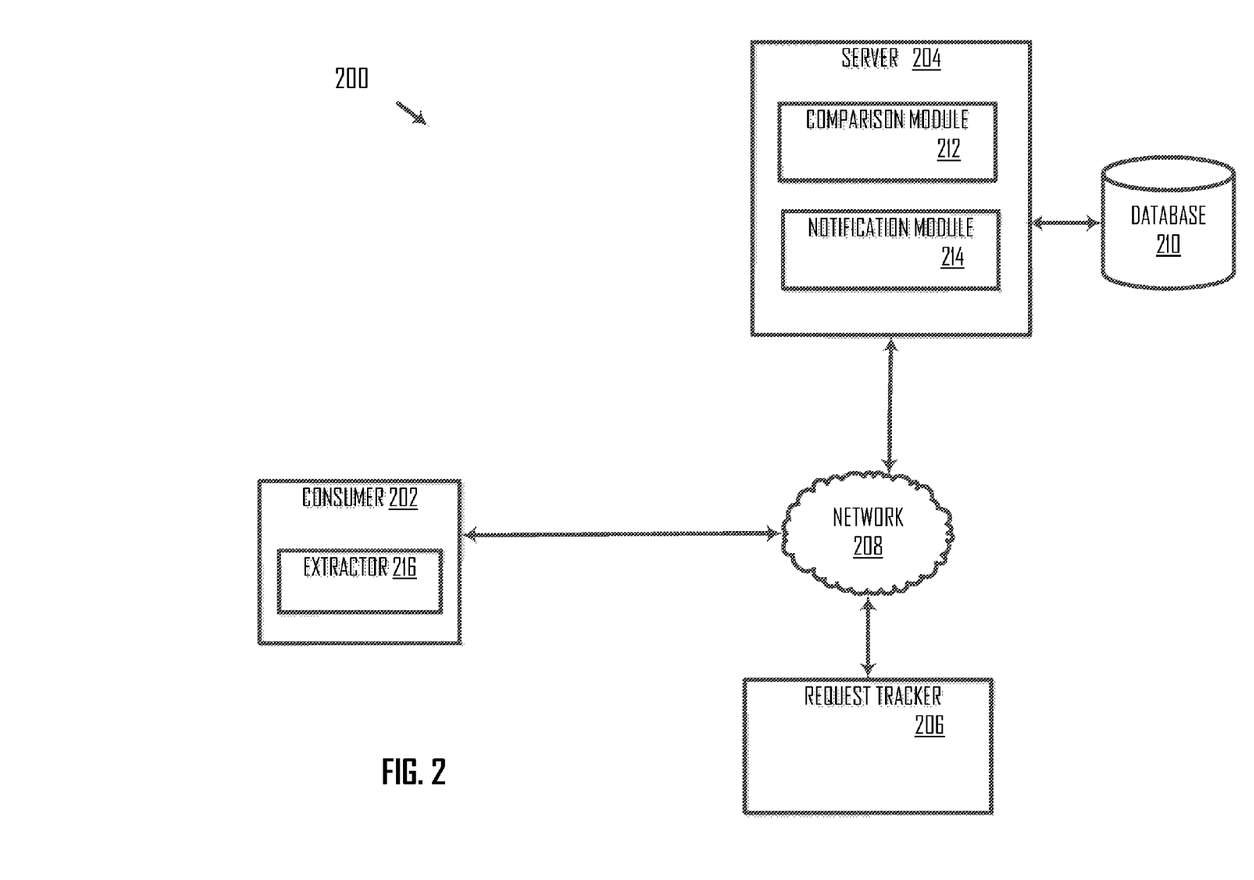
FIG. 2 is a simplified block diagram illustrating a system for tracking and maintaining kernel symbol list types, according to an embodiment.

FIG. 2 is a simplified block diagram illustrating a system 200 for tracking and maintaining kernel symbol list types, according to an embodiment.

Diagram 200 includes a kernel consumer 202, server 204, and request tracker 206 coupled to a network 208. Each of kernel consumer 202, server 204, and request tracker 206 may communicate with each other via network 208.

Network 208 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Consumer 202 may send requests to and receive responses from server 204 over network 208. Consumer 202 may also send requests to and receive responses from request tracker 206 over network 208. In an example, consumer 202 sends a request to server 204 and/or request tracker 206 for information regarding one or more kernel symbols.

A. Store the Kernel Symbol Data

Server 204 and request tracker 206 provide a framework to track and maintain kernel symbol list types. Tracking and maintaining kernel symbol list types may be beneficial to manage kernel symbols within a kernel release process. Server 204 is coupled to a database 210 that stores one or more kernel symbols of a first list type and one or more kernel symbols of a second list type. In an example, the first list type is a white list type, and the second list type is the non-white list type. Each kernel symbol of the white list type and of the non-white list type in database 210 may be included in one or more kernels, and each kernel symbol of the white list type may be included in a kernel ABI (application binary interface) of the one or more associated kernels.

In an embodiment, request tracker 206 receives from consumer 202 an identifier of a kernel and at least one of a first set of kernel symbols of a white list type and a second set of kernel symbols of a non-white list type. Request tracker 206 stores in database 210 the received first set of kernel symbols of the white list type and/or the second set of kernel symbols of the non-white list type. Request tracker 206 may send the kernel symbol data to server 204, and server 204 may store the data in database 210.

In another embodiment, consumer 202 sends the kernel symbol data (e.g., identifier of a kernel and at least one of a first set of kernel symbols of a white list type and a second set of kernel symbols of a non-white list type) directly to server 204. Server 204 may receive the kernel symbol data via the backend and store the data in database 210.

During a kernel build, a file (e.g., Module.symvers) may be generated that contains all exported symbols from the kernel and compiled modules. For each kernel symbol, the corresponding cyclic redundancy check (CRC) value may also be stored. An example syntax of the file is illustrated in the table below:

TABLE

| <CRC> | <Symbol> | <module> 0x2d036834 |
|---|---|---|
| 0x2d036834 | scsi_remove_host | drivers/scsi/scsi_mod |

Further, the kernel may be available for a wide range of possible systems. These may include many different architectures, platforms, and configuration of the kernel for such platforms. As such, architectures such as i686, i686PAE, i686xen, ia64, ia64xen, ppc64, ppc64dump, s390x, x86_64, and x86_64xen may support the kernel. In an example, a file named "module.whitelist.i686" is generated and lists the white list kernel symbols for the i686 architecture. An appropriate file may be generated and may list the white list kernel symbols for each applicable architecture. The generated files may be a plain text file, XML file, or other formatted file. The data from the files (e.g., Module.symvers and module-.whitelist.i686) may be imported into server 204.

Usage of kernel symbols in relation to architectures and kernel symbol list types may be tracked by request tracker 206. Request tracker 206 may track a consumer's release of source products (e.g., different drivers). For example, each request tracker 206 may identify the white list kernel symbols and non-white list kernel symbols included in a first source product, and identify the white list kernel symbols and non-white list kernel symbols included in a second source product. This information may be sent to server 204.

Database 210 may store white list kernel symbols and non-white list kernel symbols from third-party vendors as well as white list kernel symbols and non-white list kernel symbols from an internal team. Data in database 210 may be analyzed at a later point in time. For example, kernel symbols included in a first kernel may be compared to kernel symbols included in a second kernel.

1. Third-Party Vendor Kernel Consumer

Consumer 202 may be a third-party vendor that uses kernel symbols. In an example, the third-party vendor provides device drivers that consume kernel symbols. In particular, a device driver provided by the third-party vendor may consume white list kernel symbols and non-white list kernel symbols included in a particular kernel.

The third-party vendor may use an extractor 216 on the device driver to identify the white and non-white kernel symbols in the device driver. Extractor 216 may be provided by the kernel provider, third-party vendor, or another third party. Extractor 216 may perform a static analysis of the device driver source code or binary code. In particular, the third-party vendor may run extractor 216 against the device driver source code or binary code to generate the white list kernel symbols and non-white list kernel symbols that the device driver consumes for a particular kernel. The generated list of kernel symbols may be used by the third-party vendor to have a better understanding of the kernel symbols included and not included in the KABI of the kernel. The third-party vendor may send the generated list to server 204 and/or request tracker 206 (e.g., for storage in database 210).

Database 210 may include a set of consumers, and each consumer of the set of consumers may be associated with one or more kernels. Each kernel may include one or more kernel symbols of the white list type and one or more kernel symbols of the non-white list type. Each kernel symbol of the non-white list type may correspond to a request from the associated consumer to incorporate the respective kernel symbol of the non-white list type into the kernel ABI of a kernel.

In an example, the third-party vendor sends to request tracker 206 a request including a kernel identifier and a set of non-white list kernel symbols that the third-party vendor would like incorporated into the white list of the kernel identified by the kernel identifier. The third-party vendor may also send in the request or in a separate request one or more reasons to incorporate the set of non-white list kernel symbols into the white list of the kernel.

Request tracker 206 may receive from consumer 202 the request to include the set of non-white list kernel symbols that consumer 202 would like incorporated into the white list of the kernel. For one or more kernel symbols of the non-white list type, request tracker 206 may track a quantity of requests for the particular kernel symbol. Accordingly, the kernel provider may better determine which kernel symbols in the non-white list of a kernel are popular and determine whether to include them in the white list in future releases of the kernel. Request tracker 206 may also receive in the request one or more reasons specified by the third-party vendor to convert the set of non-white list kernel symbols into the white list of the kernel. Request tracker 206 may store this information into database 210.

In an example, the third-party vendor stores data in database 210 and/or sends requests to server 204 via a direct API to store kernel symbol data from the generated file. In another example, the third-party vendor stores data in database 210 and/or sends requests to server 204 via an HTTP request over network 208.

Based on the information from third-party vendors, the kernel provider may have a better understanding of which kernel symbols are being consumed per kernel, which kernel symbols are frequently being used, which third-party vendors are consuming which kernel symbols, the value of a kernel symbol, and how important a kernel symbol is to consumers. The kernel provider may analyze the kernel symbol data and generate statistics and reports based on the analysis.

2. Internal Kernel Consumer

In another example, consumer 202 is an internal kernel consumer that uses kernel symbols. The internal kernel consumer may provide maintenance on and development of the kernel, and also determine whether to include a kernel symbol in the white list of a kernel.

When the internal kernel consumer updates the kernel (e.g., releases a new version of the kernel or recompiles a kernel), the list of kernel symbols included in the updated kernel is available. In an example, when a kernel is updated, kernel symbols from the kernel are extracted and placed in a file (e.g., Module.symvers file). The file is generated and includes all of the kernel symbols in the kernel.

In an example, the internal kernel consumer sends a request to server 204 for the white list and/or non-white list kernel symbols included in a given kernel. The request may include a kernel identifier that identifies the given kernel. Server 204 may receive the request, search database 210 for the white list and/or non-white list kernel information associated with the given kernel, and return to the internal kernel consumer the white list and/or non-white list kernel symbols included in the given kernel. The response may provide the internal kernel consumer with a better understanding of which kernel symbols should be included in the next version of the kernel. In an example, the internal kernel consumer stores data in database 210 and/or sends requests to server 204 via a direct API to store kernel symbol data from the generated file. In another example, the internal kernel consumer stores data in database 210 and/or sends requests to server 204 via an HTTP request over network 208.

B. Compare Kernel Symbols and Notifications

Database 210 may store a first set of white list kernel symbols and a second set of non-white list kernel symbols included in a first kernel, and a third set of white list kernel symbols and a fourth set of non-white list kernel symbols included in a second kernel. The second kernel may be different from the first kernel. The second kernel may be an updated version of the first kernel, or the first kernel may be an updated version of the second kernel.

Server 204 includes a comparison module 212 and notification module 214. In an embodiment, comparison module 212 identifies the first and second kernels and compares one or more kernel symbols associated with the first kernel to one or more kernel symbols associated with the second kernel. The kernel symbols stored in database 210 may be compared and analyzed to determine, for example, whether a kernel symbol has changed or whether a non-white list symbol has been incorporated into the white list of a subsequent kernel release.

Notification module 214 may send, based on the comparison, a notification indicating a change in one or more kernel symbols associated with the first or second kernels. In an example, when a new kernel is built and imported into server 204, comparison module 212 performs one or more comparisons between a kernel symbol included in any two or more kernels.

1. Non-White List Kernel Symbol of a First Kernel May be Incorporated into the White List of a Second Kernel In keeping with the above example, comparison module 212 may compare the second set of non-white list kernel symbols included in a first kernel to the third set of white list kernel symbols included in the second kernel and determine whether the third set of white list kernel symbols includes a subset of kernel symbols included in the second set of non-white list kernel symbols. The second and third sets of kernel symbols are associated with consumer 202, and the third set of kernel symbols is included in a kernel ABI of the second kernel.

If the third set of white list kernel symbols includes a subset of kernel symbols that are included in the second set of non-white list kernel symbols, this may be an indication that one or more of the consumer's non-white list kernel symbols included in the first kernel has been included in the white list of the second kernel. As such, notification module 214 may send a notification to consumer 202 indicating that one or more kernel symbols included in the first kernel and of the consumer's non-white list type has been included in the white list of the second kernel. Based on the notification, the third-party vendor may have confidence in continuing to use the particular kernel symbol that has been incorporated into the KABI of the second kernel because the particular kernel symbol will not change in subsequent releases of the second kernel.

In an example, all kernel symbols are present in Module.symvers file, and a separate file module.whitelist.i686 for the i686 architecture lists the white list kernel symbols for a given kernel. Both of these files may be built as part of the kernel build process. The kernel symbols for a given kernel in the Module.symvers file may be compared to the kernel symbols in the module.whitelist.i686 file for the given kernel. The kernel symbols that are included in the Module.symvers file and not included in the module.whitelist.i686 file may be the kernel symbols in the non-white list.

Comparison module 212 may perform this comparison based on a variety of reasons. In an example, consumer 202 sends a request to server 204 requesting that the comparison be performed. Consumer 202 may be a third-party vendor that provides a device driver having a release cycle. Identifying these kernel symbols may enable the third-party vendor to compare different products and/or different releases of the device driver. The third-party vendor may send the request on a regular basis (e.g., based on the release cycle of the third-party vendor's product or quarterly).

In another example, comparison module 212 performs the comparison based on the kernel being updated. For instance, the internal team may decide to incorporate one or more non-white list kernel symbols of the first kernel into the white list of the second kernel. This incorporation may be due to requests that have been tracked by request tracker 206. Comparison module 212 may include an internal compare mechanism. In an example, for each consumer that consumes a given kernel, comparison module 212 compares the new kernel symbols to corresponding kernel symbols included in a previous version of the given kernel. Notification module 214 may include an internal notification mechanism that notifies consumers that have requested the newly incorporated kernel symbols of such information.

In an example, comparison module 212 determines a list of consumers that have previously requested that one or more kernel symbols of the non-white list be incorporated into the white list of a kernel. Notification module 214 may send a notification to each consumer in the list of consumers, where the notification indicates that one or more kernel symbols of the respective consumer's non-white list has been included in the white list of a kernel.

In another example, comparison module 212 performs the comparison based on a consumer's manual input. In another example, comparison module 212 performs the comparison based on a scheduled comparison. Comparison module 212 may perform the comparison based on other reasons.

2. Changes to a Non-White List Kernel Symbol

The kernel provider may update a kernel symbol in the non-white list (e.g., via a REST API to server 204). In an example, a kernel symbol included in a kernel may be updated and the updated kernel symbol may be included in a different kernel. Accordingly, a kernel symbol of the non-white list in the first kernel may have a corresponding kernel symbol of the non-white list in the second kernel. In the example table above, "scsi_remove_host" may be included in both the first kernel and the second kernel. The second kernel may be an updated version of the first kernel. If the kernel provider updates scsi_remove_host in a subsequent kernel release, it may be beneficial to notify kernel consumers of the update. In particular, it may be desirable for a consumer to be notified when a kernel symbol included in a first kernel has been changed and included in a second kernel. If the second kernel is an updated version of the first kernel, the notification may include what changes have been made since the kernel symbol was included in the first kernel.

In an example, the consumer is a third-party vendor providing a device driver that consumes a given kernel symbol included in a first kernel, and the kernel provider changes the given kernel symbol and includes the changed kernel symbol in the second kernel. Accordingly, the device driver may be able to access the given kernel symbol in the first kernel, but unable to access the corresponding kernel symbol in the second kernel because of the change. Identifying these kernel symbol changes may enable the third-party vendor to determine when to compile the device driver for compatibility with a particular kernel. For example, to enable the device driver to access the corresponding kernel symbol in the second kernel, the third-party vendor may recompile the device driver for compatibility with the second kernel. It may be desirable to send a notification to the consumer indicating that the given kernel symbol has changed. Based on the notification, the third-party vendor may decide to recompile the device driver to consume the corresponding kernel symbol in the second kernel.

In an example, the consumer is an internal kernel consumer that receives updates regarding changes to non-white list kernel symbols. This information may assist internal kernel consumers maintain and track changes to the kernel.

Each kernel symbol stored in database 210 may be associated with a checksum. In an example, a first checksum based on scsi_remove_host in the first kernel may be generated, and a second checksum based on scsi_remove_host in the second kernel may be generated. If the first checksum matches the second checksum, the scsi_remove_host kernel symbol in the first kernel and the scsi_remove_host kernel symbol in the second kernel are the same. In contrast, if the first checksum does not match the second checksum, the scsi_remove_host kernel symbol in the first kernel and the scsi_remove_host kernel symbol in the second kernel are different, and the function has been changed.

In an embodiment, comparison module 212 compares a first checksum of a first kernel symbol of the non-white list to a second checksum of a second kernel symbol of the non-white list, where the first kernel symbol is included in the first kernel and corresponds to the second kernel symbol that is included in the second kernel. For each checksum mismatch, notification module 214 may send a notification to the consumer indicating that the first kernel symbol has been changed in the second kernel. The notification may include the one or more differences between the first and second kernel symbol changes. It may be unnecessary to determine whether the kernel symbols have changed in a white list because these kernel symbols do not change.

Comparison module 212 may perform this comparison based on a variety of reasons. In an example, consumer 202 sends a request to server 204 requesting that the comparison be performed. The third-party vendor may send the request on a regular basis (e.g., based on the release cycle of the third-party vendor's product or quarterly). In another example, comparison module 212 performs the comparison based on the kernel being updated. The kernel may be updated in an internal release or an external release. Notification module 214 may notify a consumer (e.g., one or more internal teams) that the kernel has been updated.

In another example, comparison module 212 performs the comparison based on a consumer's manual input. In another example, comparison module 212 performs the comparison based on a scheduled comparison. Comparison module 212 may perform the comparison based on other reasons.

As discussed above and further emphasized here, FIG. 2 is merely an example, which should not unduly limit the scope of the claims. For example, although system 200 is described herein with reference to request tracker 206 receiving the kernel symbol data, server 202 may receive the kernel symbol data.

Further, it should be understood that one or more modules or components (e.g., comparison module 212 and notification module 214) in FIG. 2 may be combined with another module or component. In an example, comparison module 212 and notification module 214 are combined into one module. It should also be understood that one or more modules in FIG. 2 may be separated into more than one module. In an example, comparison module 212 is split into a first comparison module and a second comparison module (not shown).

Additionally, each of the modules or components in FIG. 2 may reside in a machine different from that shown in FIG. 2. For example, request tracker 206 may reside in server 204 or in a physical machine different from server 204.

Figure 3:
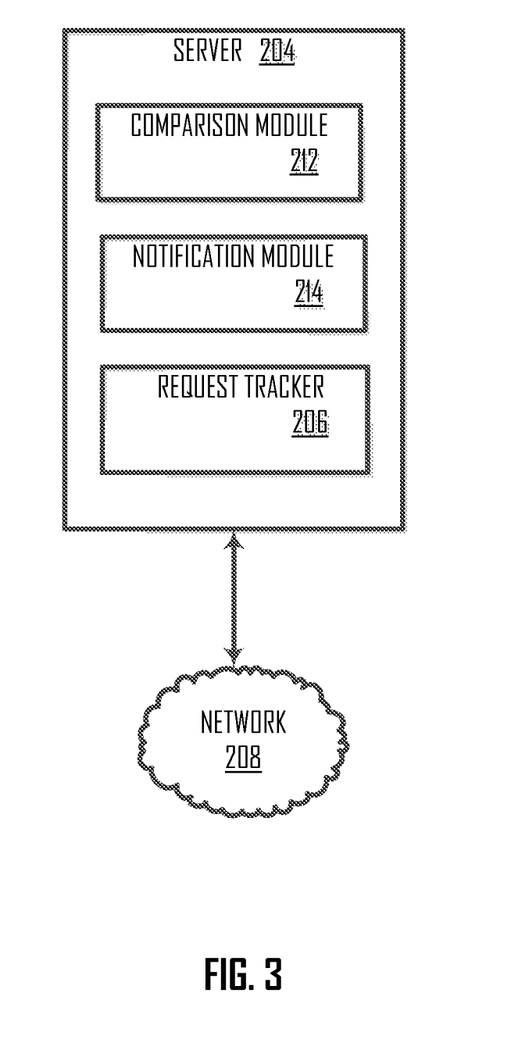
FIG. 3 is a simplified block diagram illustrating a server for tracking and maintaining kernel symbol list types, according to an embodiment.

FIG. 3 is a simplified block diagram illustrating server 204 for tracking and maintaining kernel symbol list types, according to an embodiment. Server 204 includes comparison module 212, notification module 214, and request tracker 206 coupled to network 208.

III. Scaling Out to the Cloud

Further, when server 204 receives kernel symbol data or a request for kernel symbol data, the processing may be performed on a single server (e.g., server 204) or in parallel with different virtual machines. The analysis of the kernel symbol data may be performed on the virtual machines on the backend. In this way, faster performance may be provided to consumers.

Figure 4:
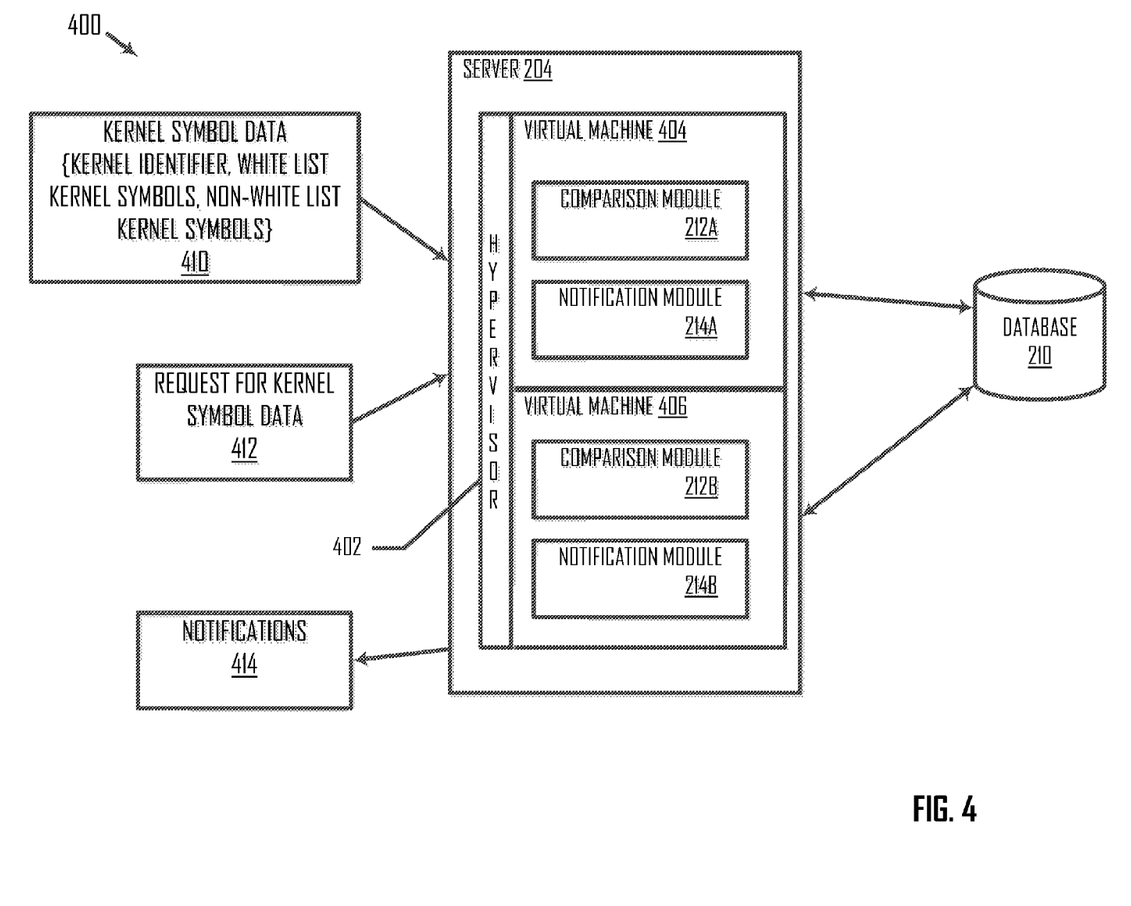
FIG. 4 is a simplified block diagram illustrating a system including virtual machines for tracking and maintaining kernel symbol list types, according to an embodiment.

FIG. 4 is a simplified block diagram 400 illustrating a system including virtual machines for tracking and maintaining kernel symbol list types, according to an embodiment.

Diagram 400 includes server 204 that receives kernel symbol data. In an example, kernel symbol data 410 includes a kernel identifier, white list kernel symbols included in the kernel identified by the kernel identifier, and non-white list kernel symbols included in the kernel identified by the kernel identifier. In an example, consumer 202 sends kernel symbol data 410 to request tracker 206, which then sends kernel symbol data 410 to server 204. In another example, consumer 202 sends kernel symbol data 410 to server 204.

Server 204 may be referred to as a host machine that hosts a set of virtual machines. Server 204 includes a hypervisor 402 that creates virtual machines 404 and 406. Virtual machine 404 includes comparison module 212A and notification module 214A and is coupled to database 210. Similarly, virtual machine 406 includes comparison module 212B and notification module 214B and is coupled to database 210.

Server 204 may store the kernel symbol data into a backend cloud having a separate input process that imports kernel symbol data in parallel. Implementing the input process in a backend application and periodically importing kernel symbol data 410 may be fast and effective when server 204 desires to receive quick kernel symbol updates and provide quick analysis (e.g., responses and notifications) of kernel symbol data for consumers.

In an example, consumer 202 may send a request for kernel symbol data 412 that is processed by server 204 using virtual machines 404 and 406. When multiple kernels and/or consumers are analyzed, hypervisor 402 may start multiple virtual machines to analyze the kernel symbol data for the different consumers. For example, virtual machine 404 may compare a kernel symbol between two kernels for a first consumer, and virtual machine 406 may compare a kernel symbol between two kernels for a second consumer. Each of the virtual machines may return the results to server 204, and server 204 may send the appropriate notifications 414 to the consumers.

IV. Example Methods

Figure 5:
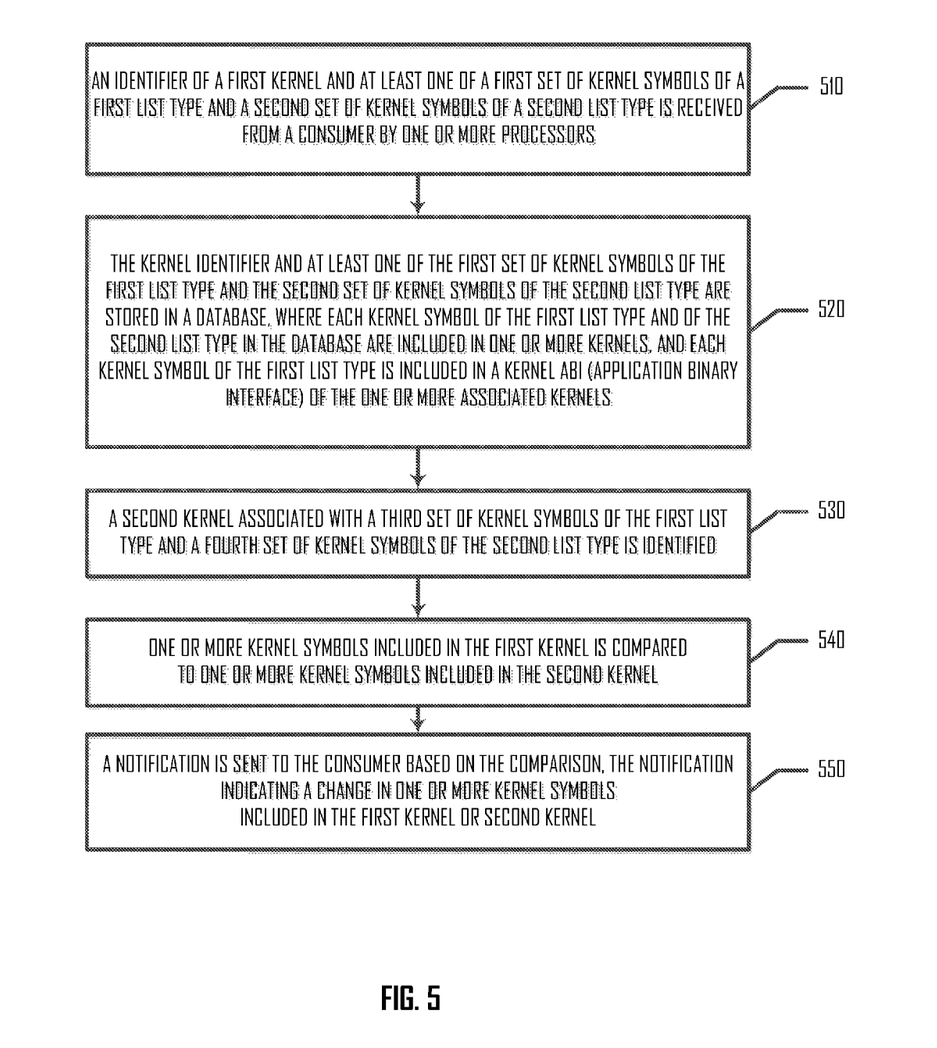
FIG. 5 is a simplified flowchart illustrating a method of tracking and maintaining kernel symbol list types, according to an embodiment.

FIG. 5 is a simplified flowchart illustrating a method 500 of tracking and maintaining kernel symbol list types, according to an embodiment. Method 500 is not meant to be limiting and may be used in other applications.

Method 500 includes steps 510-550. In a step 510, an identifier of a first kernel and at least one of a first set of kernel symbols of a first list type and a second set of kernel symbols of a second list type are received from a consumer by one or more processors. In an example, request tracker 206 receives, by one or more processors, from a consumer an identifier of a first kernel and at least one of a first set of kernel symbols of a first list type and a second set of kernel symbols of a second list type.

In a step 520, the kernel identifier and at least one of the first set of kernel symbols of the first list type and the second set of kernel symbols of the second list type are stored in a database, where each kernel symbol of the first list type and of the second list type in the database is included in one or more kernels, and each kernel symbol of the first list type is included in a kernel ABI (application binary interface) of one or more of the associated kernels. In an example, request tracker 206 stores in a database the kernel identifier and at least one of the first set of kernel symbols of the first list type and the second set of kernel symbols of the second list type, where each kernel symbol of the first list type and of the second list type in the database is included in one or more kernels, and each kernel symbol of the first list type is included in a kernel ABI (application binary interface) of one or more of the associated kernels.

In a step 530, a second kernel associated with a third set of kernel symbols of the first list type and a fourth set of kernel symbols of the second list type is identified. In an example, comparison module 212 identifies a second kernel associated with a third set of kernel symbols of the first list type and a fourth set of kernel symbols of the second list type.

In a step 540, one or more kernel symbols included in the first kernel is compared to one or more kernel symbols included in the second kernel. In an example, comparison module 212 compares one or more kernel symbols included in the first kernel to one or more kernel symbols included in the second kernel.

In a step 550, a notification to the consumer is sent based on the comparison, the notification indicating a change in one or more kernel symbols included in the first kernel or second kernel. In an example, notification module 214 sends, based on the comparison, a notification to the consumer, the notification indicating a change in one or more kernel symbols included in the first kernel or the second kernel.

It is also understood that additional method steps may be performed before, during, or after steps 510-550 discussed above. It is also understood that one or more of the steps of method 500 described herein may be omitted, combined, or performed in a different sequence as desired.

V. Example Computing System

Figure 6:
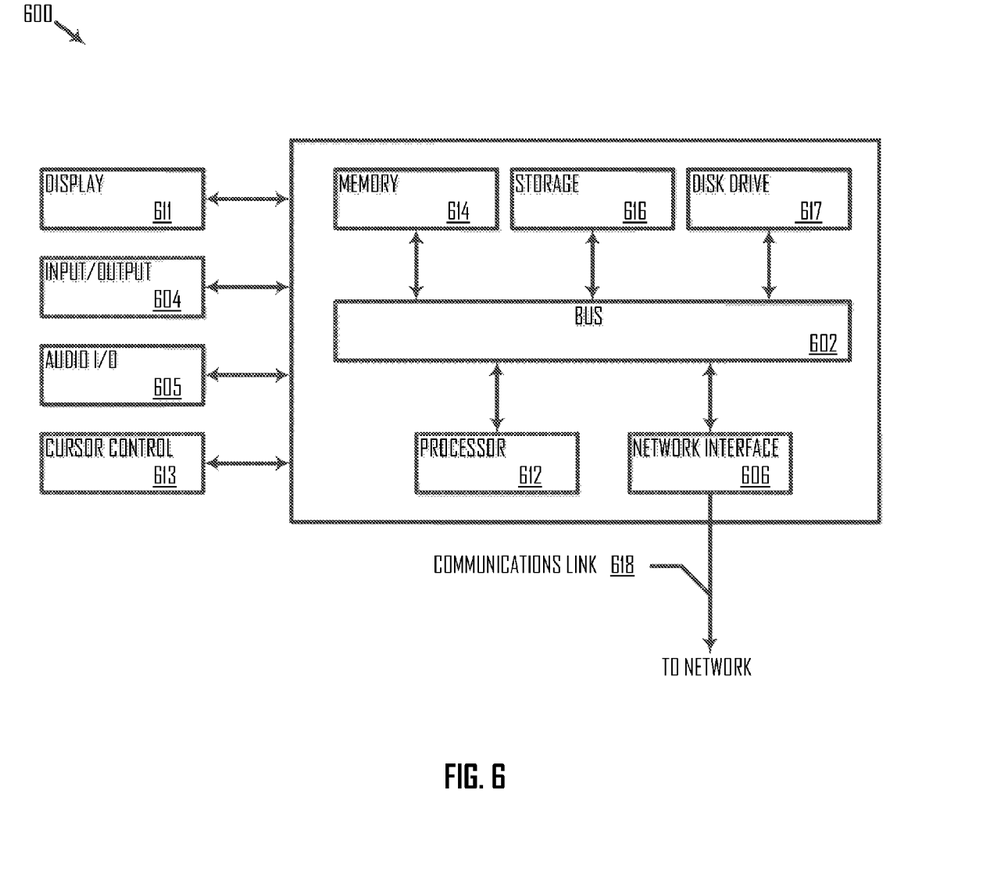
FIG. 6 is a block diagram of a computer system suitable for implementing one or more embodiments of the present disclosure.

FIG. 6 is a block diagram of a computer system 600 suitable for implementing one or more embodiments of the present disclosure. In various implementations, host machine 100, server 204, and/or request tracker 206 may include a client or a server computing device. The client or server computing device may include one or more processors. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a micro-controller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614.

Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A system for tracking and maintaining kernel symbol list types, the system comprising:
   a database that stores one or more kernel symbols of a first list type and one or more kernel symbols of a second list type in a computer memory;
   a request tracker that receives from a consumer an identifier of a first kernel and at least one of a first set of kernel symbols of the first list type and a second set of kernel symbols of the second list type,
   wherein each kernel symbol of the first list type and of the second list type in the database is included in one or more kernels, and each kernel symbol of the first list type is included in a kernel ABI (application binary interface) of the one or more associated kernels,
   wherein the request tracker stores in the database the at least one of a first set of kernel symbols of a first list type and a second set of kernel symbols of a second list type;
   a comparison module that identifies a second kernel associated with a third set of kernel symbols of the first list type and a fourth set of kernel symbols of the second list type and compares one or more kernel symbols included in the first kernel to one or more kernel symbols included in the second kernel; and
   a notification module that sends, based on the comparison, a notification to the consumer, wherein the notification indicates a change in one or more kernel symbols included in the first kernel or second kernel.

2. The system of claim 1, wherein the comparison module compares the second set of kernel symbols included in the first kernel to the third set of kernel symbols included in the second kernel and determines whether the third set of kernel symbols includes a subset of kernel symbols included in the second set of kernel symbols, wherein the third set of kernel symbols is included in a kernel ABI of the second kernel.

3. The system of claim 2, wherein the notification indicates that one or more kernel symbols included in the first kernel and of the consumer's second list type has been included in the first list type of the second kernel.

4. The system of claim 2, wherein the comparison module determines a list of consumers that have previously requested that one or more kernel symbols of the subset of kernel symbols be included in the first list type of a kernel, and wherein the notification module sends a notification to each consumer in the list of consumers, and the notification indicates that one or more kernel symbols of the respective consumer's second list type has been included in the first list type of the second kernel.

5. The system of claim 1, wherein the second kernel is an updated version of the first kernel.

6. The system of claim 1, wherein the database includes a set of consumers, and each consumer of the set of consumers is associated with one or more kernels, each kernel including one or more kernel symbols of the first list type and one or more kernel symbols of the second list type, and
   wherein each kernel symbol of the second list type corresponds to a request from the associated consumer to incorporate the respective kernel symbol of the second list type into the kernel ABI of a kernel.

7. The system of claim 1, wherein the request tracker receives from the consumer one or more reasons to convert the second set of kernel symbols of a second list type into the first list type.

8. The system of claim 1, wherein for one or more kernel symbols of the second list type, the request tracker tracks a quantity of requests for the respective kernel symbol.

9. The system of claim 1, wherein each kernel symbol is associated with a checksum, and the comparison module compares a first checksum of a first kernel symbol of the second set to a second checksum of a second kernel symbol of the fourth set, wherein the first kernel symbol included in the first kernel corresponds to the second kernel symbol included in the second kernel, and
   wherein for each checksum mismatch, the notification module sends a notification to the consumer indicating that corresponding kernel symbol has been changed in the second kernel.

10. The system of claim 9, wherein the second set of kernel symbols is included in a device driver, and the notification is an indication to the consumer to recompile the device driver for compatibility with the second kernel.

11. The system of claim 1, wherein the first and second sets of kernel symbols are included in a device driver, further comprising:
    an extractor that identifies the first and second sets of kernel symbols in the device driver.

12. The system of claim 1, wherein the first set of kernel symbols is mutually exclusive of the second set of kernel symbols.

13. A method of tracking and maintaining kernel symbol list types, the method comprising:
    receiving, by one or more processors, from a consumer an identifier of a first kernel and at least one of a first set of kernel symbols of a first list type and a second set of kernel symbols of a second list type;
    storing in a database the kernel identifier and at least one of the first set of kernel symbols of the first list type and the second set of kernel symbols of the second list type,
    wherein each kernel symbol of the first list type and of the second list type in the database are included in one or more kernels, and each kernel symbol of the first list type is included in a kernel ABI (application binary interface) of the one or more associated kernels;
    identifying a second kernel associated with a third set of kernel symbols of the first list type and a fourth set of kernel symbols of the second list type;
    comparing one or more kernel symbols included in the first kernel to one or more kernel symbols included in the second kernel; and
    sending, based on the comparing, a notification to the consumer, the notification indicating a change in one or more kernel symbols included in the first kernel or second kernel.

14. The method of claim 13, wherein the comparing includes comparing the second set of kernel symbols included in the first kernel to the third set of kernel symbols included in the second kernel and determining whether the third set of kernel symbols includes a subset of kernel symbols included in the second set of kernel symbols, the third set of kernel symbols being included in a kernel ABI of the second kernel.

15. The method of claim 14, wherein the notification indicates that one or more kernel symbols included in the first kernel and of the consumer's second list type has been included in the first list type of the second kernel.

16. The method of claim 14, wherein the comparing includes determining a list of consumers that have previously requested that one or more kernel symbols of the subset of kernel symbols be included in the first list type of a kernel, and the sending includes sending a notification to each consumer in the list of consumers, the notification indicating that one or more kernel symbols of the respective consumer's second list type has been included in the first list type of the second kernel.

17. The method of claim 13, wherein the second kernel is an updated version of the first kernel.

18. The method of claim 13, further comprising:
for one or more kernel symbols of the second list type, tracking a quantity of requests for the respective kernel symbol.

19. The method of claim 13, wherein each kernel symbol is associated with a checksum, the method further comprising:
comparing a first checksum of a first kernel symbol of the second set to a second checksum of a second kernel symbol of the fourth set, the first kernel symbol included in the first kernel corresponding to the second kernel symbol in the second kernel; and
for each checksum mismatch, sending a notification to the consumer indicating that the first kernel symbol has changed.

20. A non-transitory machine-readable medium comprising a plurality of machine-readable instructions that when executed by one or more processors are adapted to cause the one or more processors to perform a method comprising:
receiving from a consumer an identifier of a first kernel and at least one of a first set of kernel symbols of a first list type and a second set of kernel symbols of a second list type;
storing in a database the kernel identifier and at least one of the first set of kernel symbols of the first list type and the second set of kernel symbols of the second list type,
wherein each kernel symbol of the first list type and of the second list type in the database are included in one or more kernels, and each kernel symbol of the first list type is included in a kernel ABI (application binary interface) of the one or more associated kernels;
identifying a second kernel associated with a third set of kernel symbols of the first list type and a fourth set of kernel symbols of the second list type;
comparing one or more kernel symbols included in the first kernel to one or more kernel symbols included in the second kernel; and
sending, based on the comparing, a notification to the consumer, the notification indicating a change in one or more kernel symbols included in the first kernel or second kernel.

* * * * *